United States Patent Office
2,709,983
Patented June 7, 1955

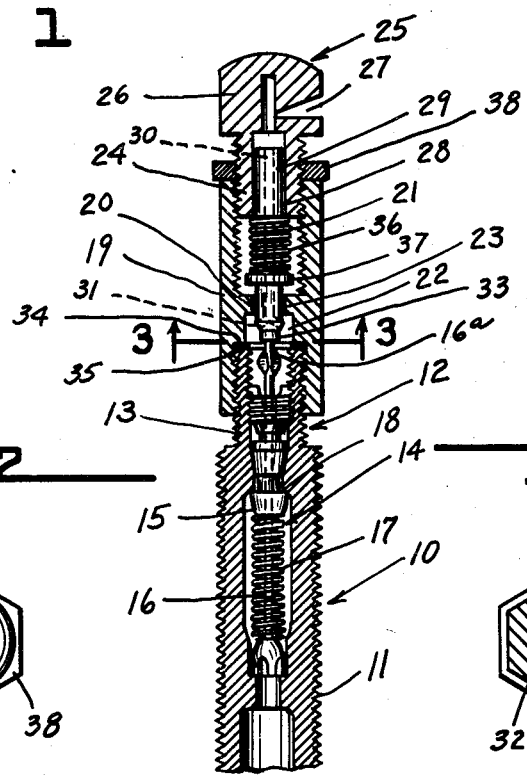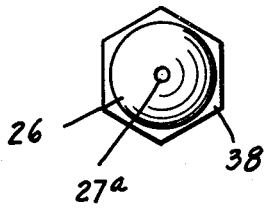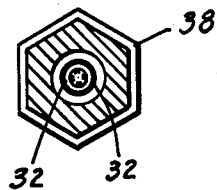

2,709,983

ALARM MECHANISM FOR AUTOMOBILE TIRES

James F. Divietro, Elkhart, Ind.

Application March 22, 1954, Serial No. 417,631

1 Claim. (Cl. 116—34)

This invention relates to an alarm mechanism for use with automobile tires, and more particularly to an audible alarm for warning the vehicle drive that his tire air pressure is dangerously low.

It is the primary object of this invention to provide an audible alarm that the driver will distinctly and immediately recognize as a signal either of imminent personal danger or of impending damage to his tires. If, for example, a slow leak should develop in the inner tube, the driver would be warned by the automatic actuation of the invention that his tire air pressure was below the safety point. He can then take immediate precautions first, of course, by stopping his vehicle and second by inspecting the tire and taking the necessary action.

Every driver of motor vehicles whether of the commercial or pleasure type, has at one time or other been advised by another person that one of his tires is low. This information may come after the tire has been in that condition for many miles of driving. Danger of an accident and damage to the tire are inevitable when the air pressure gets below a certain point. While the driver in many instances is able to "sense" or "feel" that a tire is low, dependence upon sensory reactions is not always reliable. In a day and age of lower tire pressures for greater riding comfort, of higher horsepowers and of power steering there is less likelihood than formerly that a person will be able to sense when the danger point in tire pressure has been reached. With the present invention, the driver will have a certain and reliable means of determining that danger point.

It is a further object of the present invention to provide means for accomplishing the above-mentioned objectives with a minimum number of parts at a minimum expense. As a result, the mechanism is readily available to all regardless of their financial means, and reluctance to buy, now termed "buyer resistance" is largely overcome.

It is a still further object of the present invention to provide a device of this character wherein adjustability to various desired actuating pressures is readily accomplished with a minimum of effort. No special mechanical skill is required.

The full nature of the invention will be understood from the accompanying drawings and the following description and claim.

In the drawings,

Fig. 1 is a vertical section view of the invention shown applied to the valve stem of an inner tube.

Fig. 2 is a top plan view thereof showing the whistle head and a lock nut.

Fig. 3 is a cross section view taken on line 3—3 of Fig. 1 in the direction of the arrows.

In the drawings the valve stem to which the invention is applied is shown at 10. This is the conventional stem that is connected to inner tubes and projects through an accommodating aperture in the tire rim. Since the tube is not itself a part of the invention it is not illustrated in the drawings.

The stem is externally threaded at 11 and includes the conventionally reduced upper portion 12 that is also externally threaded at 13. Mounted within the stem is the inner valve shown generally at 14. It is sometimes referred to as the air valve and includes the valve head 15, the elongated compression pin 16 and the compression spring 17. The pressure of the air within the tube biases the valve head into sealing abutment with the seat 18 thereby effecting a closure and preventing the escape of air.

The foregoing described mechanism is old and is part of conventional equipment. The invention itself comprises the alarm housing 19 which in vertical section is substantially H-shaped as shown in Fig. 1. The central partition 20 divides the housing in upper and lower chambers 21 and 22 respectively, they being in communication through the passage 23. Each chamber is internally threaded to receive respectively the stem portion 12 and the externally threaded whistle portion 24.

The whistle is shown generally at 25, it comprising the head 26 having restricted opening 27 as well as the aforementioned threaded portion 24. Extending through portion 24 is a bore 28 which receives the whistle compression pin 29. A passage 30 is formed through the pin, the passage branching at 31 to form the outlets 32 (see Figs. 1 and 3). The lower end of pin 29 is reduced at 33 and serves as an abutment which engages the upper end 16a of the inner valve compression pin.

In operation the housing is screw threaded upon the reduced portion of the valve stem until the upper edge of the stem abuts the shoulder 34 of chamber 22. A washer 35 may be interposed, if desired, between the edge and the shoulder. At this time the whistle parts are assembled within the housing, if they have not already been so assembled therewithin. When in this condition, the whistle compression pin will be in abutment with the end 16a of the valve compression pin. The former pin will be urged downwardly by the spring 36 which envelops it and bears upon the flange 37 secured thereto. The pressure of this spring will have been set, for example, at 18 pounds. On the other hand, the pressure in the tube will normally be, for example 28 pounds. Since the pressure bearing upon the valve head is the greater of the two pressures, the whistle compression spring 36 and pin 28 will be urged upwardly as shown in Fig. 1. The tube will thus be sealed against air escapement through the valve, and as long as this normal condition exists, the whistle will remain unactuated.

Once, however, the pressure of the tube through one cause or another such as a slow leak, is reduced to a point below 18 pounds, then the spring 36 will force pin 28 downwardly and with it pin 16. As the latter pin is thus moved, the valve head is unseated and air rushes into chamber 22 and from thence into branches 32, passage 30 and out through opening 27. As a result a whistling sound is caused which serves as the warning signal to the driver.

When it is desired to change the 18 pounds pressure mentioned above, then the whistle head is screwed in to increase the pressure or is screwed out to decrease it. The lock nut 38 is in the meantime tightened so as to hold the members in the desired adjusted position. Thus the pressure at which the pin 29 will unseat the valve head may readily be determined. If desired, the whistle portion may be indexed to aid the user in determining how much to adjust it to secure the desired results.

While the invention has been illustrated and described in detail in the drawings and foregoing description, the same is to be considered as illustrative and not restrictive in character, it being understood that only the preferred embodiment has been shown and described and that all changes and modifications that come within the spirit of

The invention claimed is:

An alarm mechanism for use with tire tubes including a valve and a valve stem, comprising a housing threaded upon said stem, a whistle having a portion threaded within the upper end of said housing, and means to operate said whistle upon the air pressure in the tube decreasing to a predetermined number of pounds, said means comprising a reciprocal pin mounted in said housing and engageable with said valve, said pin extending within said whistle portion and including a longitudinal passage formed therethrough communicating respectively with said valve and said whistle, resilient means associated with said pin and tensioned normally to cause said pin to be retracted by said valve against the bias of said resilient means, said whistle portion being engageable with said resilient means and adjustable to vary the tension thereof, said pin being movable by said resilient means to unseat said valve when the air pressure within said tube is less than the tension of said resilient means.

References Cited in the file of this patent

UNITED STATES PATENTS

| | | |
|---|---|---|
| 1,010,726 | Collins | Dec. 5, 1911 |
| 1,298,538 | Meyers | Mar. 25, 1919 |
| 1,417,168 | Harris | May 23, 1922 |
| 1,756,273 | Wynkoop | Apr. 29, 1930 |